April 8, 1952  R. N. KNOSP ET AL  2,592,433
INDICATING DIAL OPERATING MECHANISM
Filed Aug. 7, 1947  2 SHEETS—SHEET 1

INVENTORS
Robert N. Knosp
BY Carl E. Linden
Frank O. Wetzel
Wood, Arey, Herron & Evans
ATTORNEYS April 8, 1952 R. N. KNOSP ET AL 2,592,433
INDICATING DIAL OPERATING MECHANISM
Filed Aug. 7, 1947 2 SHEETS—SHEET 2

INVENTOR.
Robert N. Knosp
BY Carl E. Linden
Frank O. Wetzel
Word, Arey, Herrin & Evans
ATTORNEYS Patented Apr. 8, 1952

2,592,433

UNITED STATES PATENT OFFICE 2,592,433

INDICATOR DIAL OPERATING MECHANISM

Robert N. Knosp, Ludlow, Ky., and Carl E. Linden, Cincinnati, and Frank O. Wetzel, Norwood, Ohio, assignors to The Fosdick Machine Tool Company, Cincinnati, Ohio, a corporation of Ohio Application August 7, 1947, Serial No. 767,120

11 Claims. (Cl. 33—125)

This invention relates to improvements in indicator mechanism of the type utilized, for example, in jig boring machines. The improvements pertain to the construction of the mechanism for operating the dial indicator; that is to say, the improvements are not concerned with the structure of the dial indicator itself. It has been the practice of the machine tool builders to incorporate standard dial indicators in machine tools, constructing in combination with these indicators an operating mechanism appropriate to the particular machine in which the dial indicator is used.

The present improvements, as stated, may have ready application to the structure of a jig boring machine. The conventional jig boring machine incorporates a table disposed beneath the drill, this table being mounted for longitudinal traverse on a moving slide and the slide being mounted on the bed of the machine for cross traverse. Thus, the table may be adjusted to any desired position beneath the drill. Appropriate means are provided for adjusting the table on the moving slide and for adjusting the moving slide on the base of the machine. The moving slide incorporates a trough lying alongside the table parallel therewith, and likewise, the bed incorporates a trough lying alongside and parallel with the ways of the bed on which the moving slide is cross traversed. Both the table and the moving slide incorporate adjustable dogs moving along the respective troughs. The purpose of the troughs is to support measuring rods.

In the instance of this type of installation, two dial indicators are utilized, one for longitudinal feed of the table, and the other for cross traverse. These dial indicators are mounted in fixed position at the outer ends of the troughs. The manufacturer of the jig boring machine also furnishes a variety of measuring rods which may be inserted in the troughs to obtain accurate settings for boring. These rods will include solid end measures to measure even inches and an adjustable micrometer graduated to read in fractions directly in one-thousandth of an inch. These measuring rods are selected to make up the appropriate length equivalent to the distance the table is to be adjusted, this distance being determined by their aggregate length between the movable dogs and the dial indicators.

The indicators are used as pressure gauges to maintain a zero point with a constant measuring pressure, thus eliminating the human element, that is, the difficulty of accurately determining the proper pressure. In other words, if the measuring dogs were disposed between positive stops or dogs, and the hand wheel operated to bring positive stops against both of the respective ends of the measuring rods, it would be difficult to tell when the proper pressure had been exerted against the ends of the rods. The dial indicators show instantly when the proper pressure has been established. They also indicate any movement of the table and maintain a positive check at all times to insure the correct positioning of the table.

A typical operation in the utilization of these dial indicators is as follows:

The table is moved through the dial to a reference point, for example, the edge of the work or another drill hole. At this time either the movable dog engages the stem of the dial indicator directly, or engagement is procured through measuring rods. The dial indicator is placed under pressure and is moved to a definite indication, such as zero. Thereupon the table is moved away and measuring rods are inserted to make up the distance the hole is to be bored from the reference point. The table is then moved back to move the stop against the measuring rods as now inserted, and pressure is applied to the dial indicator to bring it back to the reference point. At this time, the operator will know that the table carrying the work has been set the precise distance from the reference point desired. Any variation from this reference point will be indicated by a plus or minus deviation from the reference point on the dial.

In the past, it was the practice to have the measuring rods disposed between the stops on the table and on the movable slide and the stems of the indicator dials. Any shocks transmitted through the measuring rod, either by sudden movement of the hand wheel or by manual movement of the measuring rods along the trough, were transmitted directly to the indicator stem and the delicate mechanism.

It has been the object of the present inventors to provide an improved actuating mechanism for the dial indicator whereby shocks will not be transferred to the indicator stem and whereby resultant damage to the internal meshanism of the sensitive dial indicator is eliminated. Specifically, it has been the purpose to accomplish this by having the shock load act away from the indicator, unloading it rather than loading it. In other words, the actuator mechanism will tend to relieve the dial indicator of pressure when shock is imparted to the indicator stem for any of the above reasons. The mechanism employed for this purpose will normally, by pressure upon the indicator stem, hold the indicator finger at some established point which may be readily adjusted through mechanism incorporated in the indicator itself. When the engagement occurs against the actuating mechanism through the measuring rods, the movement of the actuating mechanism is way from the stem rather than toward it.

Inasmuch as a pressure will be normally maintained on the indicator stem, it has been a further object of the present inventors to provide a means for locking the actuating mechanism out of position when the machine is not being used so that the dial is not constantly maintained under pressure; in other words, is permitted to relax.

Also, at times, it might well happen that the pressure applied, by means of the hand wheel, between the dogs and the dial indicator mounting, that is, the casing, would become extremely excessive and the mounting would be damaged, the dogs would be displaced, or the delicate threads of the micrometer rod would be damaged.

Thereupon, it has been a further object of the present inventors to avoid damage because of these occurrences. Toward this end they have provided a mechanism which will automatically eject the measuring rods or deflect them away from operative contact with the dail indicator operating mechanism as the measuring rods are engaged against the dial indicator operating means to move it beyond its normal operative range. Further, this ejection means is effective for displacing the rods from the trough and at the same time for causing the locking means to latch the dial actuating means automatically in an inoperative position.

Other objects and certain advantages of the invention will be more fully apparent from a description of the drawings in which.

Figure 1:
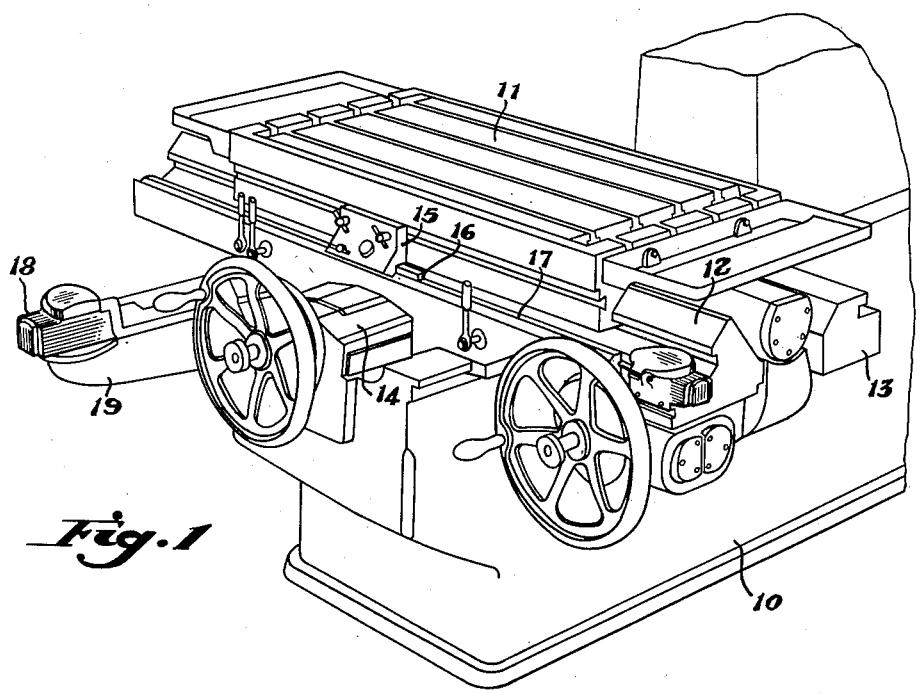
Figure 1 is a perspective view of the lower portion of a jig boring machine illustrating the work table, the longitudinal cross slide mechanism and the respective dial indicators associated therewith.
Figure 3:
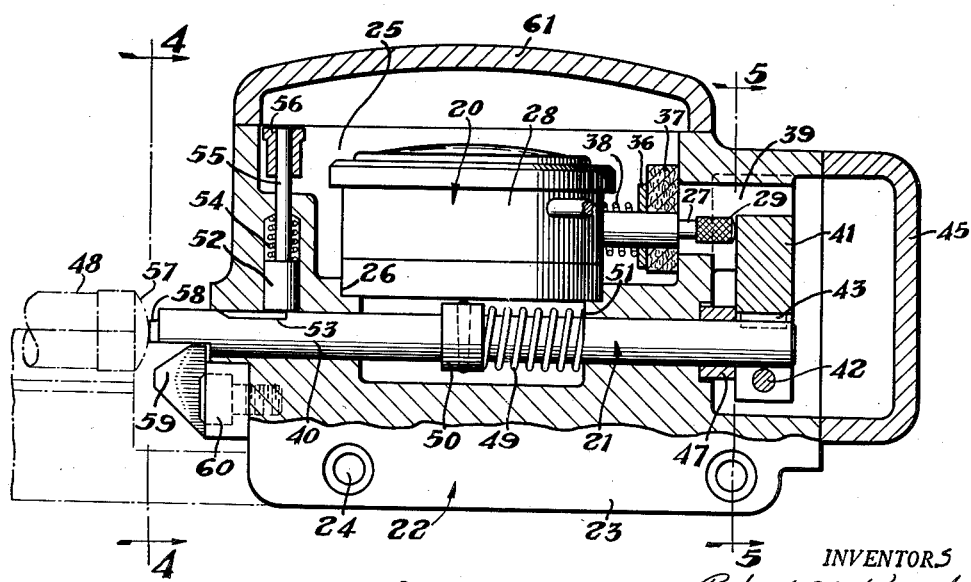
Figure 3 is a sectional view taken on line 3—3, Figure 2, this view illustrating in detail the apparatus used to operate the dial indicator.

Referring to the drawings, the principal parts of the jig boring machine concerned herein will be referred to generally. The base of the machine is indicated at 10. The table is shown at 11 and is slidable longitudinally on the ways 12 of a movable slide 13. The slide 13 is, in turn, traversed along the ways 14 of the bed. Both the table 11 and movable slide 13 include adjustable dogs 15, only the dog attached to the table being shown for the present illustration. The dog 15, as shown, includes an abutment extension 16 which moves along a trough 17 and also relative to indicator markings along the trough (not shown).

The dial indicator assemblies which incorporate the present improvements are generally indicated at 18, being fixed to the movable slide 13, and to an extension 19 of the body, respectively. Obviously, since the improvements relate to the actuating mechanism for the dial indicators, it would be useless to duplicate the illustration and description. Accordingly, only one of the dial indicators is specifically illustrated in Figures 2 to 5.

Each dial indicator assembly consists of a dial indicator unit 20, an actuating mechanism shown generally at 21 and, a supporting casing or body structure shown at 22 for supporting the dial indicator itself and the operating dial mechanism. The main body casing 22 includes a flange 23 traversed by bolt or screw holes 24 for securing the casing in position adjacent the trough. The casing is appropriately formed to provide a recess or cavity 25 containing the dial indicator mechanism. The dial indicator mechanism fits within a counterturned recess 26, that is, is seated therein and fixed in position.

The dial indicator includes an operating stem 27 projecting radially outwardly therefrom and guided within a sleeve or boss projecting from the side of the casing 28 of the dial indicator. This stem is mounted for axial movement and includes a head 29 having a rounded outer end adapted for abutment. The fingers 30 and 31 of the dial indicator are actuated by this stem. The large finger indicates movement in increments of $1/1000$ of an inch, whereas the smaller indicator finger 31 shows the aggregate travel of the larger finger. The dial 32 relative to which the finger 30 moves will indicate lineal movement of $1/100$ of an inch in one revolution of the indicator finger and will travel through approximately five revolutions. It is sufficient to say that the dial is extremely sensitive. An appropriate stem, indicated at 33, is provided for varying the position of the dial if desired. This latter stem projects radially from the dial indicator through an aperture 34 in the side wall of the casing and its knurled knob 35 is disposed outside the casing.

The hub supporting the operating stem has mounted thereon a washer 36 and a felt washer element 37, the latter lying against the end wall of the casing. The felt washer is maintained against the side wall of the recess of the casing by means of a coil spring 38 under pressure between the washer 36 and the casing of the dial indicator. The operating end of the stem projects into a cavity or opening 39 formed through the wall of the casing. The felt washer seals the opening or cavity 39 and prevents the entrance of dust, etc., into the indicator chamber 25.

Figure 2:
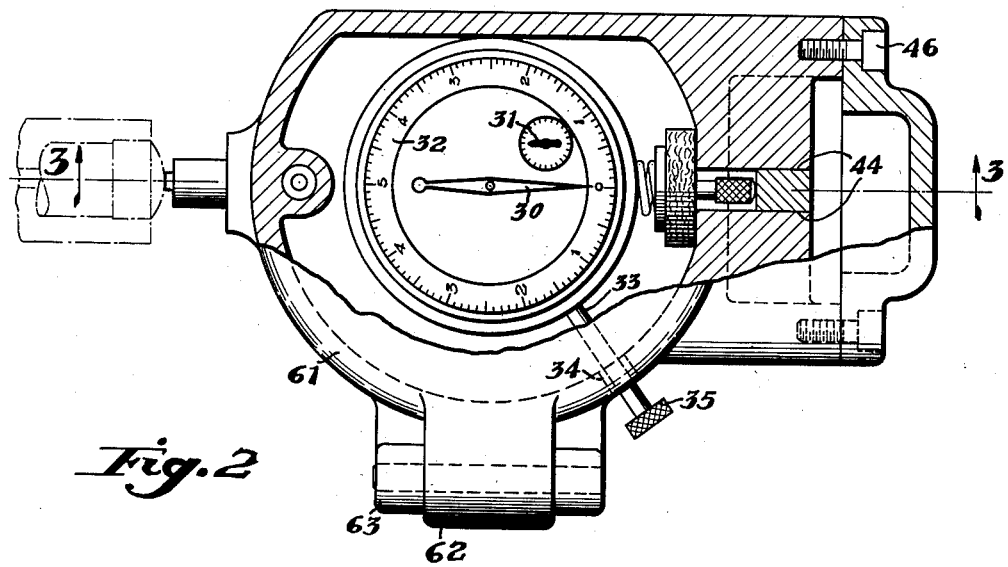
Figure 2 is a top plan view of one of the dial indicators and its supporting and operating mechanism, a portion of the casing being broken away and shown in section for illustrating the dial indicator itself.
Figures 4, 5:
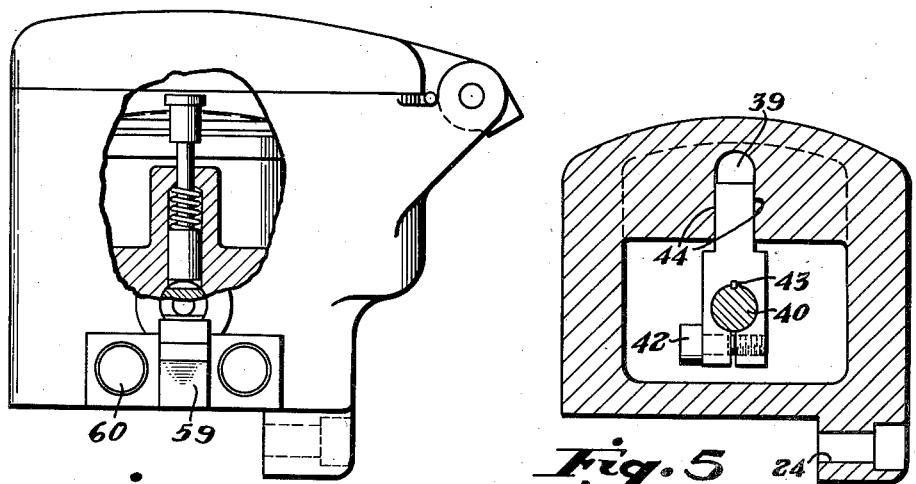
Figure 4 is an end view of the dial indicator looking toward it from that end which is engaged by the measuring rods.
Figure 5 is a sectional view taken on line 5—5, Figure 3.

The principal element of the actuating mechanism is the rod 40 which is supported through the casing diametrically of the dial indicator and beneath the same. Its inner end carries an abutment arm 41 having a split lower end encircling the rod, the split portions being drawn together by means of a screw 42. A key 43 prevents rotative displacement of the arm on the rod. The upper end of the arm contacts the stem and is guided between the side walls 44 of the opening 39. A closure cover 45 is removably secured over the end of the main casing adjacent these parts and is maintained in position by means of screws 46 (Figure 2).

A spacer sleeve 47 is provided between the arm and the body 22, this sleeve surrounding the rod 40. The rod is constantly urged toward the measuring rods, which are shown generally at 48, by means of a coil spring 49 disposed under compression between a collar 50, pinned to the rod, and the end wall 51 of the recess which contains the collar and spring beneath the dial indicator. It will be seen that the spring 49 maintains the operating mechanism in a fixed position when normally ready for use with the arm engaged against the stop sleeve or spacer sleeve and against the stem so that the dial mechanism is under some pressure.

When the operator of the machine discontinues the use of the machine for a period of time, the operating mechanism, particularly the rod 40, is held back in position releasing the dial indicator stem. This release is brought about by pushing the rod 40 to the right, that is, the direction in which it is operated by the measuring rods until the detent plunger 52 will snap into position in back of the shoulder milled across the top of the rod 40. The shoulder is produced by means of a cross groove 53. The detent plunger is urged downwardly by means of a coil spring 54 disposed about the stem 55 thereof between the upper end of the bore containing the plunger and the top of the plunger. The upper end of the stem carrying the plunger includes a manipulating knob 56 which is fixed thereto and which permits the operator to lift the detent from the groove so that the operating rod 40 may move to operative position.

The measuring rods generally shown at 48 are furnished as standard equipment with the jig boring machine. A set may consist of two 1" .0001 inside micrometers; two 1", 2", 3", 4", 5" measures and one 15" measure. These rods are extremely accurate and are positioned in alignment in the trough provided for them on the machine. They are furnished in duplicate sets to accommodate both the longitudinal table and the cross slide. The various sections may be interchanged or removed from the trough without disturbing adjacent rods. The micrometers adjustable to $1/1000$ of an inch enable the operator to maintain extremely accurate settings for boring. The ends of these rods may be rounded as shown at 57.

The end of the rod 40 includes a short counterturned extension 58 bearing against the convex or rounded end of the endmost measuring rod or micrometer. Just below the end of the operating rod 40 adjacent the mircometers, a deflecting cam 59 is secured. This cam is secured to the inner side of the casing 22 by means of screws 60. The under side of the rod is grooved out to clear this cam and to permit it to extend close to the center line of the rod. The cam inclines upwardly in position so as to be engaged by the rounded end of the endmost measuring rod or micrometer and will be effective for deflecting this element upwardly, thus ejecting the gauge mechanism and preventing undue movement or pressure being created through the gauge rods. Such pressure might damage the casing or mounting of the indicator dial or put undue strain on the threads of the micrometer rod or might displace the stop on the bed or the cross slide, as the case might be. As rod 40 is depressed and the measuring rod deflected, the spring loaded detent 52 snaps automatically into engagement in the cross groove 53, thus latching rod 40 in retracted position. This prevents the rod from snapping forward under spring pressure and striking the dial indicator stem when the gauge rod is ejected and thus protects the indicator from damage by impact upon ejection of the gauge rod.

A cover 61 is provided at the top of the casing so as to enclose the recess and cover the mechanism when not in use. This cover is provided with a hinge lug 62 disposed and pivoted between hinge lugs 63 extended from the side of the casing.

Thus, it has been arranged that all pressures exerted on the rod 40 tend to relieve the pressure on the dial indicator. In other words, when the measuring rods are placed in position and are brought into abutment with the end of the rod, should this be done suddenly, there is no shock transmitted to the mechanism, since the motion is away from it. Furthermore, should the operator slide the measuring rods abruptly along the trough and cause them to contact the end of the operating rod suddenly, this shock likewise will not be imparted to the stem. In the event of undue motion by the use of extreme pressure of the gauge dogs against the indicator mounting through the measuring rods, the movement necessary to produce this will cause upward deflection and displacement of the measuring rods and there can be no heavy pressure applied to the mechanism.

Having described our invention, we claim:

1. In combination with a machine incorporating a translatable table having a dog thereon, a support for the table having a trough disposed parallel with the path of movement of the table, the dial indicator mechanism mounted at the end of the trough and incorporating a supporting casing, a dial indicator mounted in the casing, said dial indicator including a stem projecting therefrom in a direction away from the end of the trough, a translatable rod mounted in the casing in axial alignment with the trough, said trough adapted to receive measuring rods between the dog and the end of the translatable rod, contact means on the end of the rod engaging the stem, spring means for urging said contact toward the stem under predetermined pressure, spacer means for limiting the movement of the contact means toward the stem, and cam means associated with the translatable rod for deflecting the end of the measuring rod therefrom and thereby to limit the movement of the rod and contact means away from the stem.

2. In combination with a jig boring machine including a translatable table having a dog thereon, a trough formed parallel with the table in the support member of the machine, a dial indicator mechanism mounted at one end of the trough, said mechanism incorporating a casing, a dial indicator mounted in the casing having a stem extended therefrom, a translatable rod mounted in the casing in alignment with the trough having its outer end disposed for engagement with measuring rods inserted between the dog and the end of the rod, a contact arm on the rod engaging the stem, the stem being extended in the direction away from that end of the rod engaged by the measuring rods, spring means for urging the translatable rod for causing the contact arm to engage the stem, spacer means for limiting the movement of the contact arm toward the stem, cam means adjacent the outer end of the translatable rod and disposed in the path of movement of the measuring bars as they are moved to translate the rod, said cam being effective for deflecting the measuring rods out of alignment with the rod and preventing undue pressure thereon and, detent means constructed and arranged to latch the translatable rod automatically in translated position with the contact arm out of engagement with the stem when the measuring bar is deflected out of engagement with the end of the rod.

3. In combination with a machine incorporating, a translatable table having a dog thereon, a support for said table having a trough disposed parallel with the path of movement of the table, a dial indicator mechanism mounted at the end of the trough, comprising; a supporting means, a dial indicator mounted in said supporting means, said indicator including an actuating stem projecting therefrom in a direction away from the end of the trough, a translatable rod mounted in the casing in alignment with the trough, said trough adapted to receive measuring rods between said dog and the end of the translatable rod, spring means for urging the translatable rod under predetermined pressure toward the measuring rods, contact means on the end of the rod engaging the stem and abutment means normally limiting the movement of said contact means toward said stem for holding the indicator at an intermediate point in its range whereby a predetermined pressure exerted against the rod by the measuring rods counter to the spring means will relieve the pressure on the indicator stem.

4. In combination with a jig boring machine including a translatable table having a dog thereon, a support for said table including a trough formed parallel with the table, a dial indicator mechanism mounted at one end of the trough, said mechanism incorporating a casing, a dial indicator mounted in the casing having a stem extended therefrom, a translatable rod mounted in the casing in alignment with the trough and having its outer end disposed for engagement with measuring rods inserted between the dog and the end of the rod, a contact arm on the inner end of said rod engaging the stem, the stem being extended in a direction away from the end of the rod which engages the measuring rods, spring means for urging the translatable rod toward the measuring rods to cause the contact arm to engage the stem, and spacer means for limiting the movement of the contact arm of the stem whereby movement toward the rod as caused by engagement of the measuring rods against the end of the rod counter to said spring means will relieve the pressure against the stem and will tend to unload the dial indicator.

5. In combination with a jig boring machine including a translatable table having an abutment thereon, a trough formed parallel with the table in the support member of the machine, a dial indicator mechanism mounted at one end of the trough, said mechanism incorporating a casing, a dial indicator mounted in the casing having a stem extended therfrom, a translatable rod mounted in the casing for movement parallel with the trough and having its outer end disposed for engagement with measuring rods inserted between the abutment and the end of the rod, a contact arm on the rod engaging the stem, the stem being extended in the direction away from the end of the rod which engages the measuring rods, spring means for urging the translatable rod for causing the contact arm to engage the stem at a predetermined pressure and, detent means constructed and arranged atomatically to latch the translatable rod in position with the contact arm out of engagement with the stem when the rod is translated beyond a predetermined limit of travel.

6. In combination with a jig boring machine including a translatable table having a dog thereon, a trough formed parallel with the table in the support member of the machine, a dial indicator mechanism mounted at one end of the trough, a dial indicator mounted relative to said mechanism and having a stem extended therefrom, a translatable rod mounted in the casing in alignment with the trough having its outer end disposed for engagement with measuring rods inserted between the dog and the end of the rod, a contact arm on the rod engaging the stem, the stem being extended in a direction away from the end of the rod engaging the measuring rods, spring means for urging the translatable rod toward the measuring rods to cause the contact arm to engage the stem, the spring means being arranged to preload the translatable rod under predetermined pressure toward the measuring rods, cam means adjacent the outer end of the translatable rod and disposed in the path of movement of the measuring bars as they are moved to translate the rod, said cam being effective for deflecting the measuring rods out of operating alignment with the rod and preventing undue pressure thereon.

7. In combination with a dial indicator of the type including a pressure operated actuating stem, a mechanism for operating the indicator comprising, a housing for the dial indicator, a translatable rod slidably mounted within said housing below the dial indicator, a contact arm extending upwardly from the end of said rod engaging the stem of the indicator, a spring disposed on said rod and arranged normally to create a pressure on the stem, a spacer on the rod disposed between the housing and said contact arm to limit the movement of the contact arm toward the stem and thereby maintain the indicator at a predetermined reading, the opposite end of said translatable rod extending beyond the housing and adapted to be engaged by a measuring bar to cause a fluctuation from the predetermined reading when pressure is applied to the end of the rod by contact with the measuring bar.

8. In combination with a dial indicator of the type including a pressure operated actuating stem, a mechanism for operating the indicator comprising, a housing for the dial indicator, a translatable rod slidably mounted within said housing below the dial indicator, a contact arm extending upwardly from the end of said rod engaging the stem of the indicator, a collar secured upon said rod, a spring disposed on said rod in compression between the housing and said collar to create a pressure on the stem, a spacer on the stem disposed between the housing and said contact arm to limit the movement of the contact arm toward the stem and thereby maintain the indicator dial at a predetermined reading, the opposite end of said translatable rod extending beyond the housing and adapted to be engaged by a measuring bar to cause a fluctuation from the predetermind reading when pressure is applied to the end of the rod by contact with the measuring bar, a spring loaded detent plunger angularly related to the translatable rod and slidably disposed in the housing, the translatable rod including a groove adapted to establish a latching engagement with the detent plunger when the rod is depressed to an inoperative position.

9. In combination with a jig boring machine including a translatable table having a dog thereon, a support for the table including a trough formed parallel with the table, a dial indicating mechanism including a housing mounted at one end of the trough, a dial indicator mounted in said housing and having a stem extending in a direction away from said trough, a translatable rod mounted in the housing in alignment with the trough having its outer end disposed for engagement with measuring bars inserted in the trough between the dog and the end of the translatable rod, means on the rod engaging the stem and adapted to release the stem when the dog engages the measuring bars, means for urging the translatable rod in a direction into engagement with the stem at predetermined pressure, an inclined skid disposed adjacent the outer end of the translatable rod in the path of movement of the measuring bars as they are moved to translate the rod, said skid being effective for elevating the end of the measuring bar out of operating engagement with the translatable rod when the measuring bar is moved beyond a predetermined point to prevent undue pressure upon the translatable rod and to place the end of the measuring bar in position to be lifted from the trough.

10. In combination with a machine tool including a translatable work table, a table support having a trough adapted to sustain loosely a measuring rod, the table having an adjustable dog adapted to contact an end of the measuring rod to position the table, a dial indicator mechanism mounted at the end of the trough adapted to indicate the contact of the dog with the measuring rod comprising, a casing, a dial indicator mounted in said casing having a depressible actuating steam projecting from the side opposite to the end of said trough, a translatable rod slidably mounted within the casing, a contact arm extending upwardly from said rod within the casing and contacting the stem of the dial indicator, a spring disposed on said rod and arranged normally to urge the rod and contact arm toward said stem to hold the same in depressed position, a spacer secured on said rod adapted to limit the movement of the contact arm toward the stem and to maintain the dial indicator at a predetermined setting, the outer end of said translatable rod being extended beyond the casing and adapted to be engaged by the measuring rod to indicate upon the dial indicator the contact of the said dog with the measuring rod, a stationary skid disposed beneath the translatable rod having an upwardly inclined surface and extending substantially from the outer end thereof, the extended portion of the rod being relieved to accommodate the said skid, the said skid being effective for elevating the end of the measuring rod out of engagement with the said translatable rod when the measuring rod depresses the translatable rod to a position to release the indicator stem.

11. In combination with a machine tool including a translatable work table, a table support having a trough adapted to loosely sustain a measuring rod, the table having an adjustable dog adapted to contact an end of the measuring rod to position the table, a dial indicator mechanism mounted on the table support at the end of the trough adapted to indicate the contact of the dog with the measuring rod comprising, a casing, a dial indicator mounted in said casing having a depressible actuating stem projecting away from the trough, a translatable rod slidably mounted within the casing, a contact arm extending upwardly from said rod within the casing and contacting the stem of the dial indicator, a spring disposed on said rod and arranged normally to urge the rod and contact arm toward said stem to hold the same in depressed position, a spacer secured on said rod adapted to contact a portion of the casing to limit the movement of the contact arm toward the stem and to maintain the dial indicator at a predetermined setting, the outer end of said translatable rod being extended beyond the casing and in alignment with the trough and adapted to be engaged by the measuring rod sustained in the trough to indicate upon the dial indicator the contact of the measuring rod by said dog, a spring loaded detent plunger angularly related to the translatable rod and slidably mounted within the casing, the translatable rod including a notch adapted to establish a latching engagement with the detent plunger when the rod is depressed to an inoperative position, a stationary skid disposed beneath the translatable rod having an upwardly inclined surface extending substantially from the outer end thereof, the extended portion of the translatable rod having a relieved area to receive the said skid, the said skid being effective for elevating the end of the measuring rod out of engagement with the translatable rod when the measuring rod is moved longitudinally by said dog to a position to disengage this dial indicator stem, the said detent plunger being constructed and arranged to latch the translatable rod in depressed position automatically when the measuring rod is elevated to said disengaged position.

ROBERT N. KNOSP.
CARL E. LINDEN.
FRANK O. WETZEL.

REFERENCES CITED

The following references are of record in the file of this patent:

UNITED STATES PATENTS

| Number | Name | Date |
|---|---|---|
| 1,323,267 | Hanson | Dec. 2, 1919 |
| 1,547,514 | Mueller | July 28, 1925 |
| 1,625,462 | Frauenthal | Apr. 19, 1927 |
| 1,679,224 | Maynard | July 31, 1928 |
| 2,000,057 | Arnold | May 7, 1935 |
| 2,200,884 | Hoagland | May 14, 1940 |
| 2,236,881 | Rusnak | Apr. 1, 1941 |
| 2,295,206 | Fraumann et al. | Sept. 8, 1942 |
| 2,296,749 | Tanner | Sept. 22, 1942 |
| 2,358,264 | Taylor | Sept. 12, 1944 |
| 2,462,226 | Rosenow | Feb. 22, 1949 |

FOREIGN PATENTS

| Number | Country | Date |
|---|---|---|
| 556,856 | Great Britain | 1943 |
| 875,563 | France | 1942 |